Figure 1:
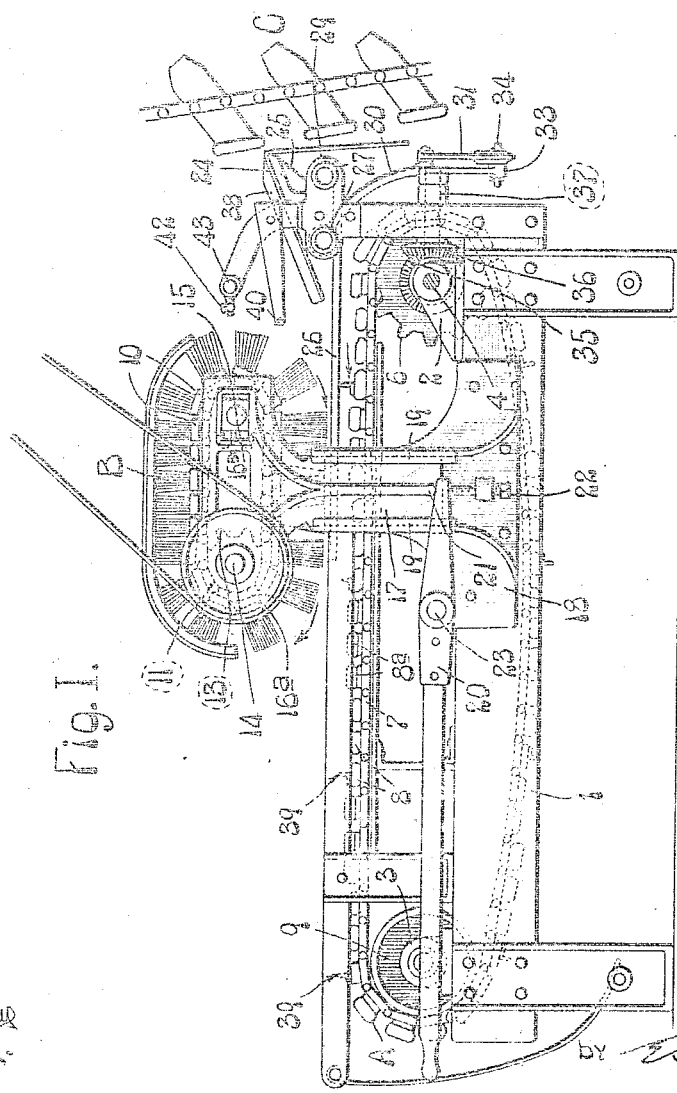

J. W. DAWSON.
BOTTLE BRUSHING MACHINE.
APPLICATION FILED APR. 12, 1910.

973,178.

Patented Oct. 18, 1910.
4 SHEETS—SHEET 1.

Attest

Inventor
J. W. Dawson
by
Atty

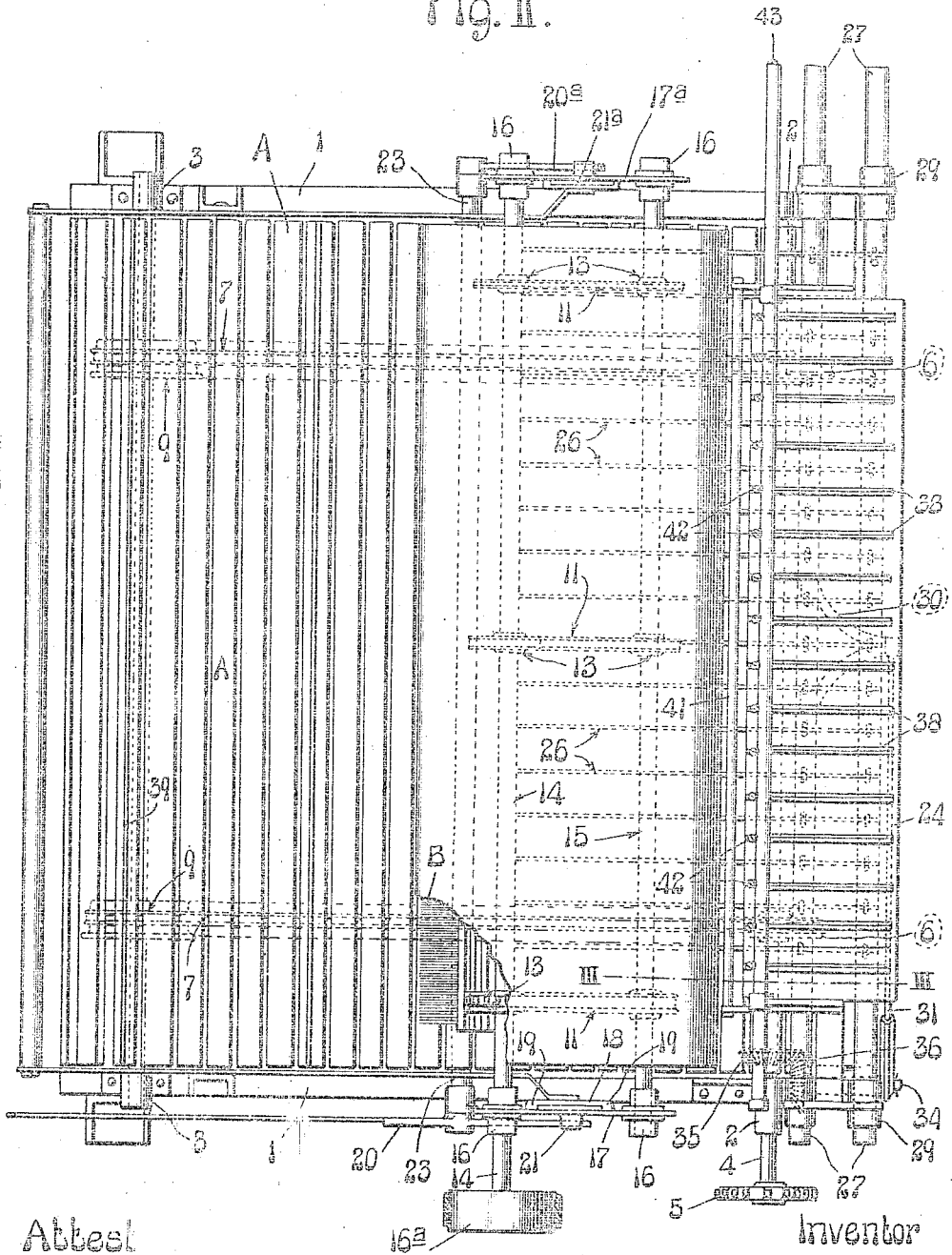

J. W. DAWSON.
BOTTLE BRUSHING MACHINE.
APPLICATION FILED APR. 12, 1910.
973,178.
Patented Oct. 18, 1910.
4 SHEETS—SHEET 3.
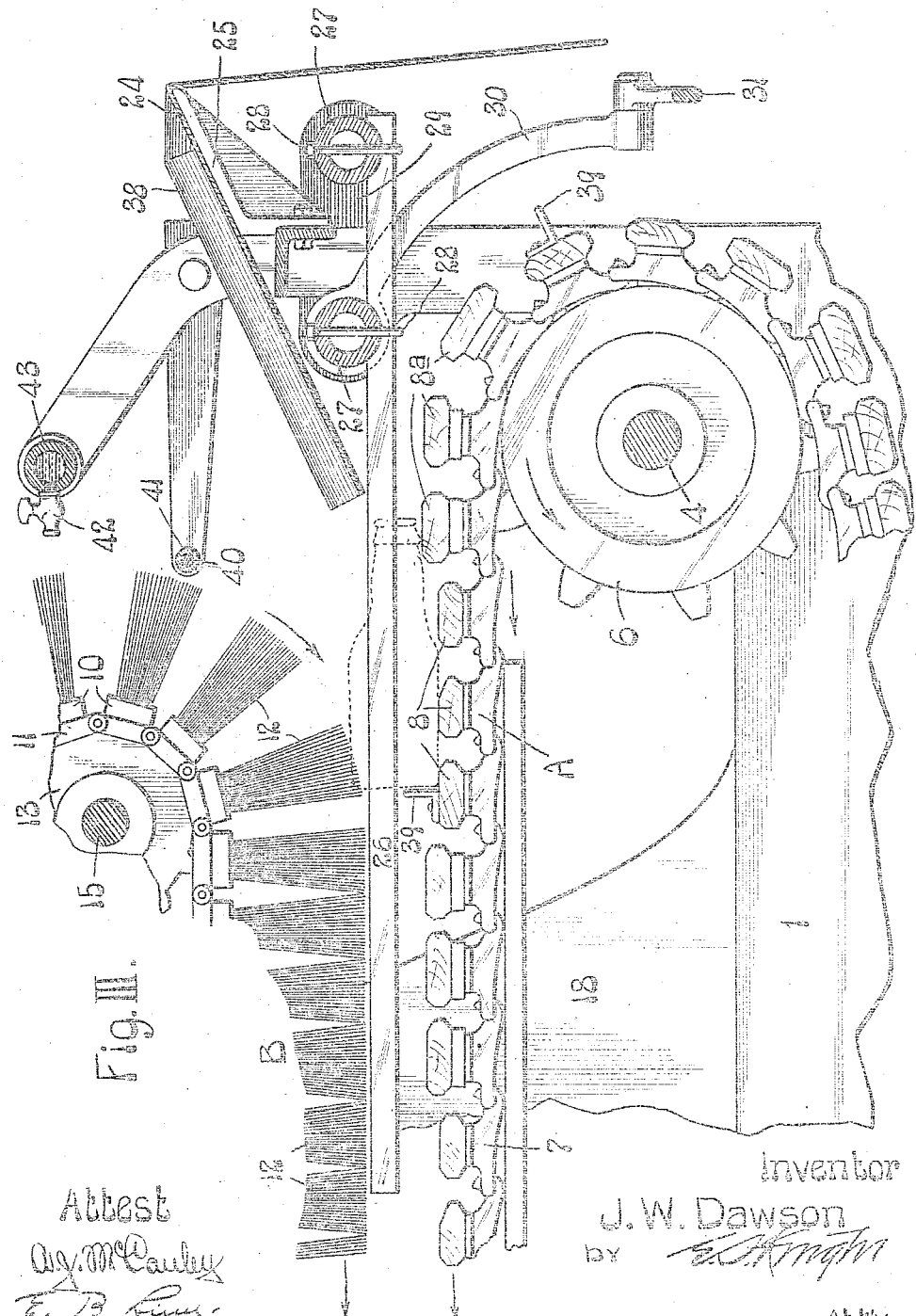
Fig. II.
Attest
Inventor
J. W. Dawson
by
Att'y.

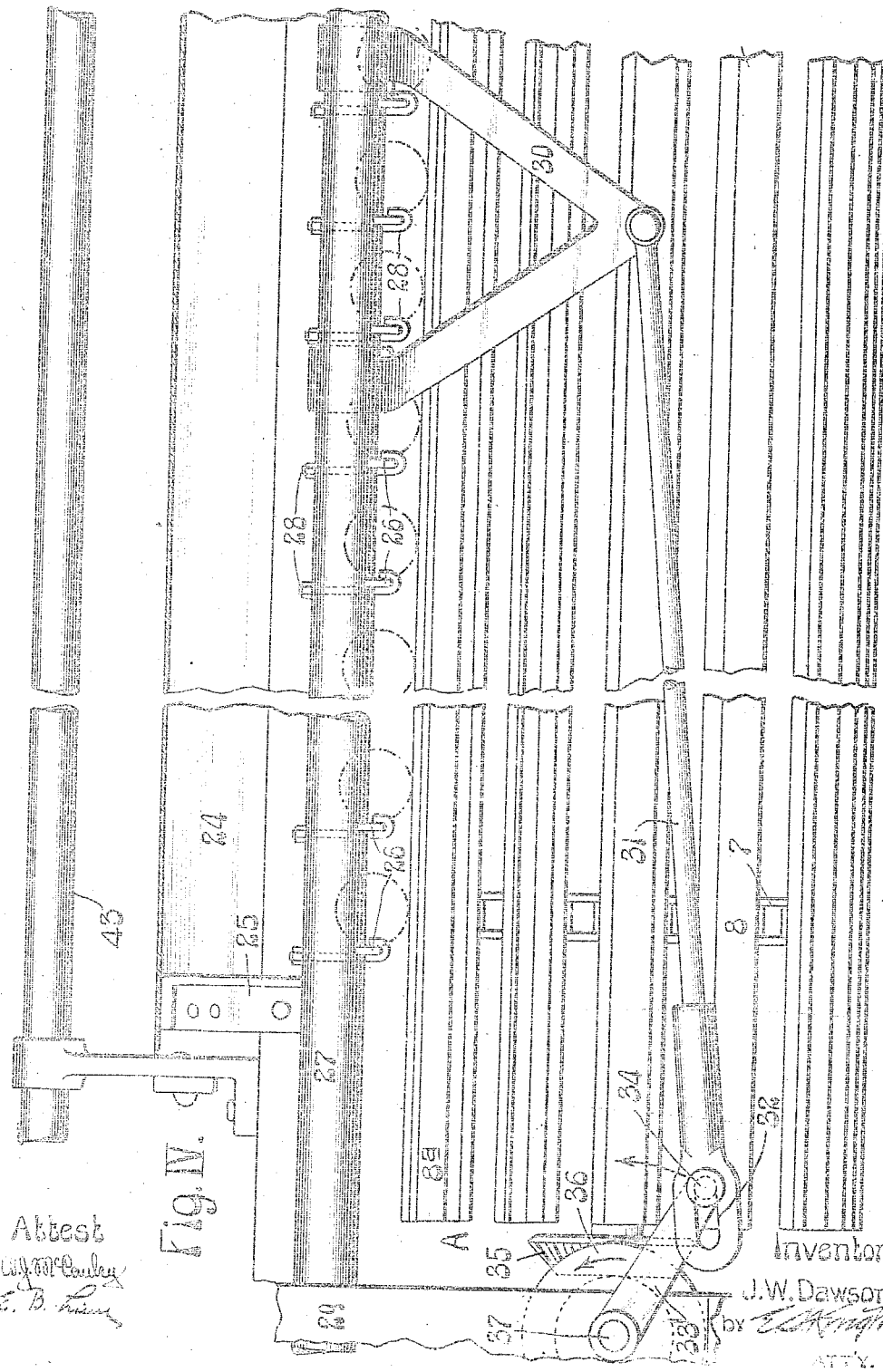

UNITED STATES PATENT OFFICE.

JOSEPH W. DAWSON, OF ST. LOUIS, MISSOURI, ASSIGNOR TO BARRY-WEHMILLER MACHINERY COMPANY, OF ST. LOUIS, MISSOURI, A CORPORATION.

BOTTLE-BRUSHING MACHINE.

973,178.  Specification of Letters Patent.  Patented Oct. 18, 1910.

Application filed April 12, 1910. Serial No. 554,931.

*To all whom it may concern:*

Be it known that I, JOSEPH W. DAWSON, a citizen of the United States of America, residing in the city of St. Louis, in the State of Missouri, have invented certain new and useful Improvements in Bottle-Brushing Machines, of which the following is a full, clear, and exact description, reference being had to the accompanying drawings, forming part of this specification.

My invention relates to a bottle brushing or scrubbing machine, and it has for its object the production of a machine of this character which will thoroughly cleanse the exterior of bottles, jars, or similar articles.

In the preferred form of my invention, the bottles are transmitted to the brushing device of a carrier which discharges them onto a chute or runway leading to an endless belt or carrier. This carrier conveys the bottles under the brushing device and, while passing thereunder, the bottles are rolled on the carrier by reciprocating members, which preferably separate the bottles from each other and cause the bottles to be effectually operated upon by the brushes. The brushing device is preferably moved at a high degree of speed and serves to remove old labels and dirt from the exterior of the bottles. If desired, the brushing device may be moistened by a stream, or streams, of water as will be hereinafter described.

Figure I is a side elevation of my bottle brushing machine. Fig. II is a top plan view of the machine. Fig. III is a vertical section taken approximately on the line III—III of Fig. II; and Fig. IV is a rear view of a portion of the parts shown in Fig. III.

In the accompanying drawings:—1 designates side frames which support bearings 2 and 3. A shaft 4, journaled in the bearings 2, is driven by power applied to a sprocket wheel 5 (see Fig. II), and said shaft has fixed to it intermediate of its ends, a pair of sprocket wheels 6.

A is an endless carrier comprising sprocket chains 7 and cleats 8 and 8ª, the chains 7 being mounted on and driven by the wheels 6. At the discharge end of the machine the carrier is supported by sheaves 9 on the shaft 3.

B indicates the brushing device comprising brushes 10, secured to sprocket chains 11. Sprocket wheels 13, fixed to shafts 14 and 15 mesh with the chains 11 and constitute the driving means therefor. Motion is imparted to the brushing device by a drive pulley 16ª on the shaft 14. The shafts 14 and 15 are journaled in bearings 16 (see Figs. I and II), mounted in vertically movable frames 17 and 17ª. The lower end or leg of the frame 17 is loosely arranged in a bracket 18 having guide flanges 19 which overlap the side edges of the frame 17. A lifting lever 20, engaged by a lug 21 on the lower end of the movable frame 17 (see Fig. I), is held in the position shown by an adjusting screw 22. The lever 20 is connected to one end of a shaft 23 which extends across the machine and has its opposite end secured to an arm 20ª that lies under a lug 21ª on the vertically movable side frame 17ª. One advantage of the lifting device just described is that the lever 20 may be operated to raise the frames 17 and 17ª when it is desired to raise the brushing device for the purpose of cleaning or gaining complete access to the conveyer A. Another obvious advantage of this structure is derived from the adjusting screw 22 which allows the brush to be adjusted toward and from the bottle carrier.

The bottles are preferably conveyed to the machine by a carrier C (see Fig. I) which, if desired, may lead from a bottle soaking apparatus. However, the conveyer C is not an essential part of this invention, inasmuch as the bottles may be fed to the machine by hand.

Arranged adjacent to the carrier C and adapted to receive bottles discharged therefrom is a chute 24 that rests on brackets 25 (see Figs. I and III). Bottle shifting arms 26, located beneath the chute 24, extend longitudinally of the carrier A and are secured to carrying rods 27 extending transversely of the machine by suitable means, such as hook bolts 28 (see Figs. III and IV). The carrying rods 27 and arms 26 are thus connected together to produce a bottle moving frame that extends between the brushing device B and the conveyer A and is adapted to receive the bottles discharged from the chute 24. The carrying rods 27 are slidingly mounted in bearings 29 and one of the carrying rods has a lever arm 30 connected to it.

31 indicates a shifter rod pivoted at one end to the arm 30 and having a slot 32 in its opposite end (see Fig. IV). A rotatable crank 33 carries a pin 34 which is operable in the slot 32 in the shifter. Rotary motion is imparted to the crank 33 by a bevel gear 35 on the shaft 4 which meshes with a bevel gear 36 on the crank shaft 37. A constant rotary movement of the crank transmits an intermittent reciprocating movement to the bottle moving arms 26 and carrying rods 27, the motion being rendered intermittent due to the slot and pin connection between the crank 33 and link 31, inasmuch as it will be understood that the slot and pin connection causes the bottle moving frame composed of the arms 26 and rods 27 to stop at the end of each stroke. The movement of the bottle moving frame is so timed that it stops when the arms 26 are alined with division members 38 on the chute 24 and at this time the carrier C discharges bottles onto the chute. This timing of the parts causes the bottles to pass from the chute into the spaces between arms 26 and eliminates all liability of the bottle striking the upper edges of said arms.

After passing onto the conveyer A, the bottles are spaced apart by the arms 26 to avoid breakage, and they are rolled on the conveyer by the reciprocating bottle moving means and, as the bottles pass under the brushing device B, their surfaces are thoroughly operated upon by the brushes, and old labels, or other matter adhering thereto, is removed.

The brushes and carrier A preferably move in the same direction, as indicated by arrows in Fig. III, but the brushes travel at a high speed and force the bottles against stops 39 on the conveyer A, said stops serving to retard the endwise movements of the bottles on the carrier while they are being rolled and acted on by the rapidly moving brushes. The cleats 8ª of the carrier A support the neck of the bottle when engaged by the brushes.

A rod 40, which extends across the machine adjacent to the discharge end of the chute 24, is covered by a tube 41 of yielding material that serves as a yielding stop for bottles that are accidentally thrown upwardly when they pass onto the constantly moving carrier A.

The brushes of the brushing device B are preferably kept in a wet condition by streams of water delivered from nozzles 42 fitted to a water supply pipe 43.

I claim:—

1. A bottle brushing machine, comprising a carrier, a brushing device above said carrier, and bottle moving means shiftable transversely of said carrier and whereby the bottles resting upon the carrier are moved transversely thereof while being operated upon by said brushing device.

2. A bottle brushing machine, comprising a carrier, a brushing device above said carrier, bottle moving means shiftable transversely of said carrier and whereby the bottles resting upon the carrier are moved transversely thereof while being operated upon by said brushing device, and means for imparting reciprocatory movement to said bottle moving means.

3. A bottle brushing machine, comprising a carrier, a brushing device, and bottle moving means operable transversely of said carrier, the bottle moving means being provided with arms extending over said carrier and between which the bottles are adapted to lie while resting upon the carrier to be moved thereon.

4. A bottle brushing machine, comprising a carrier, a brushing device operable above said carrier, a frame movable transversely of said carrier and having bottle shifting members by which the bottles are separated and moved transversely of the carrier while being operated upon by said brushing device, and means for moving said frame independently of the carrier and brushing device.

5. A bottle brushing machine, comprising a carrier, a brushing device operable above said carrier, a frame movable transversely of said carrier and having bottle shifting members by which the bottles are separated and moved transversely of the carrier while being operated upon by said brushing device, and means for reciprocating said frame.

6. A bottle brushing machine, comprising a carrier, a brushing device operable above said carrier, a chute leading to said carrier, and a cushion member arranged above the member adjacent to the point at which the bottles are discharged from said chute onto said carrier.

JOSEPH W. DAWSON.

In the presence of—
    HOWARD G. COOK,
    EDNA B. LINN.